United States Patent Office 2,945,073
Patented July 12, 1960

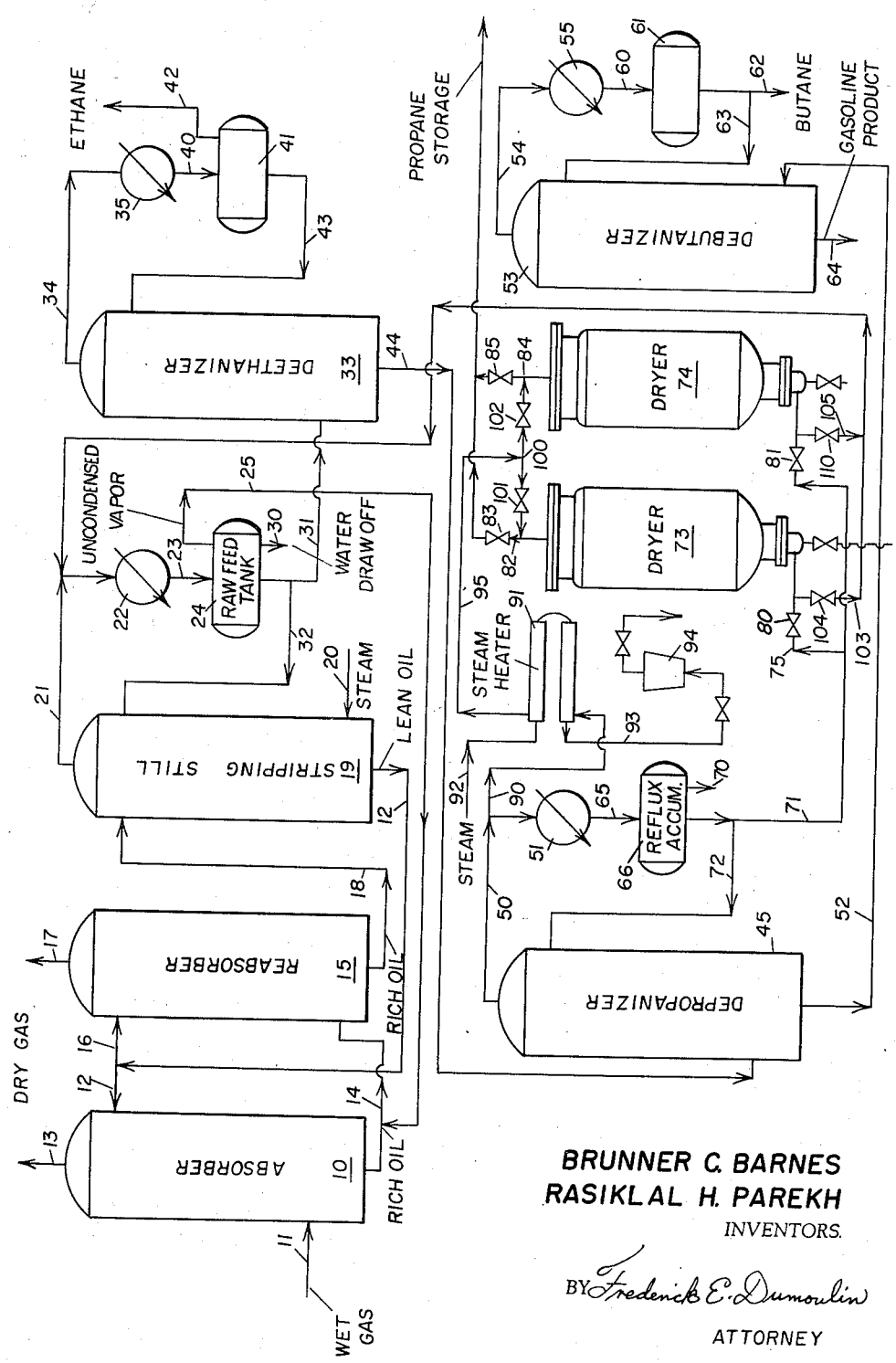

2,945,073
RECOVERY OF PROPANE FROM NATURAL GAS

Brunner C. Barnes and Rasiklal H. Parekh, Dallas, Tex., assignors, by mesne assignments, to Socony Mobil Oil Company, Inc., New York, N.Y., a corporation of New York Filed Jan. 28, 1957, Ser. No. 636,626

4 Claims. (Cl. 260—676)

This invention relates to the treatment of natural gas and relates more particularly to the recovery of propane from natural gas.

Natural gas, as obtained from its original source in a subterranean formation, consists primarily of methane but contains smaller amounts of ethane, propane, and butane and heavier hydrocarbons. Ordinarily, the natural gas is treated to separate and recover each of the methane, ethane, propane, butane, and heavier hydrocarbons. In one method for so treating the natural gas, the gas is contacted with an absorption oil whereby the hydrocarbons other than the methane are absorbed and the gaseous methane is recovered. The absorption oil containing the absorbed hydrocarbons is thereafter subjected to steam distillation to desorb the absorbed hydrocarbons. The desorbed hydrocarbons are recovered as a liquid product and the absorption oil is recirculated to contact fresh natural gas. As a result of the steam distillation, the liquid product contains free water. This free water is permitted to settle and is removed from the liquid product. Thereafter, the liquid product is subjected to a series of fractionation steps to recover separately the ethane, propane, and perhaps the butane and various of the other hydrocarbons. While free water is permitted to settle and is removed from the liquid product obtained by steam distillation, a certain amount of water remains in the product. The conditions for fractionation of the liquid product to recover the ethane and propane are such that the greater amount of the water remaining in the liquid product is carried over into the ethane but a small amount can be carried over into the propane. The presence of water in the ethane is not particularly objectionable. However, to render the propane commercially acceptable, substantially all water must be removed. Drying, or removal of water, requires various processing steps involving the use of various equipment. Desirably, drying is effected as simply and efficiently as possible to reduce the cost of recovery of commercially acceptable propane to a minimum.

It is an object of this invention to recover propane from natural gas. It is another object of this invention to remove water from propane obtained by absorption from natural gas. It is another object of this invention to simplify the processing steps required for the recovery of dry propane by absorption from natural gas. It is another object of this invention to reduce the amount of equipment required for drying of propane recovered by absorption from natural gas. These and other objects of this invention will become apparent from the following detailed description.

The accompanying drawing is a schematic diagram illustrating the invention.

In accordance with the invention, a portion of the propane obtained as overhead by fractionation of the liquid hydrocarbon product recovered by steam distillation of the absorption oil is condensed. This portion of the propane is then contacted with a desiccant. Thereafter, another portion of the propane is heated to a temperature above the boiling point of water. This latter portion of the propane is then employed to regenerate the desiccant. Following the regeneration step, this latter portion of the propane is admixed with the overhead product recovered by steam distillation of the absorption oil and free water is permitted to settle and is removed from the mixture.

Referring now to the drawing, natural gas containing at least methane, ethane and propane and perhaps butane and heavier hydrocarbons enters absorber 10 through line 11. The gas entering the absorber may be described as a wet gas. The description as a wet gas does not, however, have reference to the presence of water in the gas. Rather, the description has reference to the presence of hydrocarbons heavier than methane. A dry gas, according to this description, is methane free of admixture with heavier hydrocarbons.

The wet gas flows upwardly through the absorber. Absorption oil enters near the top of the absorber through line 12 and flows downwardly through the absorber. The downwardly flowing absorption oil contacts the upwardly flowing wet gas and absorbs from the wet gas a small amount of the methane and substantially all of the ethane, propane, and any heavier hydrocarbons contained in the wet gas. The dry gas leaves the absorber through line 13. The dry gas may be transferred thereafter to a pipe line for use as fuel or otherwise recovered for such use as desired. The absorption oil containing the hydrocarbons absorbed from the wet gas stream, now termed the rich oil, passes through line 14 to the lower section of reabsorber 15.

Reabsorber 15 is operated at a lower pressure than absorber 10 and part of the methane, the ethane, and the heavier hydrocarbons absorbed in the rich oil thus flash from the rich oil. These gases pass upwardly through the reabsorber. Absorption oil enters near the top of the reabsorber through line 16 and flows downwardly through the reabsorber. The downwardly flowing absorption oil contacts the upwardly flowing gases and absorbs substantially all of the ethane and heavier hydrocarbons. Only a minor portion of the methane is absorbed and the remaining portion of the methane leaves the reabsorber through line 17. The rich oil leaves the reabsorber through line 18 and passes to stripping still 19.

Steam entering through line 20 blows upwardly through the rich oil in the stripping still 19. As a result of this steam distillation of the rich oil, the absorbed hydrocarbons are stripped from the absorption oil and pass overhead along with the steam from the stripping still through line 21. The absorption oil free of the absorbed hydrocarbons, now termed the lean oil, leaves the still through line 12 and is recycled to the absorber 10.

The overhead product from the stripping still 19 passes through condenser 22 where it is subjected to partial condensation. The greater portion of the water and the ethane, as well as a still greater portion of the propane and heavier hydrocarbons, are condensed in the condenser 22. The overhead product then passes through line 23 to raw feed tank 24. Any methane carried along with the rich oil from the absorber and reabsorber to the stripping still will not be condensed in condenser 22 and is removed overhead as uncondensed vapor from the raw feed tank through line 25. A small amount of ethane and heavier hydrocarbons may also be uncondensed and may be otherwise carried out of the raw feed tank 24 as uncondensed vapor. To recover the methane as dry gas and minimize loss of the ethane and heavier hydrocarbons by reabsorption in the lean oil, the uncondensed vapor is returned to the reabsorber 15 by way of line 14. Free water settles out of the condensed hydrocarbon product in the raw feed tank and is removed from the tank through water draw-off line 30.

The condensed hydrocarbon product in raw feed tank 24 is removed from the tank through line 31. A portion of the product is returned as reflux through line 32 to the stripping still 19. The remainder of the product enters deethanizer 33. In deethanizer 33 the condensed hydrocarbon product is fractionated, heat being supplied by means of a reboiler (not shown), or other suitable type of heating device, within the deethanizer to separate ethane from the product. The ethane passes overhead from the deethanizer through line 34 to condenser 35 where it is partially condensed. The ethane product is removed from the condenser through line 40 and is passed to reflux accumulator 41. The ethane is removed from the accumulator through line 42. A portion of the ethane in reflux accumulator 41 is returned as reflux to the deethanizer through line 43.

The hydrocarbon product entering deethanizer 33 from which product free water was settled and removed in raw feed tank 24, contains dissolved water. The greater portion of this dissolved water passes overhead from the deethanizer through line 34 along with ethane. The water is condensed in condenser 35 and enters reflux accumulator 41. From the reflux accumultor, the water is removed along with ethane through line 42. A portion of the water returns to the deenthanizer through line 43 along with reflux but is removed from the deethanizer through line 34 along with the water dissolved in the hydrocarbon product entering the deethanizer.

The liquid product free of ethane but containing any dissolved water not removed from the liquid hydrocarbon product in deethanizer 33 is removed from the deethanizer through line 44 and is passed to depropanizer 45. In depropanizer 45 the liquid product is fractionated, heat being supplied by means of a reboiler (not shown), or other suitable type of heating device within the depropanizer to separate propane from the liquid product. Propane passes overhead from the depropanizer through line 50 and enters condenser 51 where it is condensed. The condensed product leaves the condenser through line 65 and enters reflux accumulator 66.

The liquid product free of the propane is removed from the depropanizer through line 52 and is passed to debutanizer 53. In debutanizer 53, the liquid product is fractionated, heat being supplied by means of a reboiler (not shown), or other suitable type of heating device within the debutanizer to separate butane from the liquid product. Butane passes overhead from the debutanizer through line 54 to condenser 55 where it is condensed to the liquid state. The condensed butane is removed from the condenser through line 60 and is passed to reflux accumulator 61. The condensed butane is removed from the accumulator through line 62. A portion of the butane is returned as reflux to the debutanizer through line 63. Hydrocarbons heavier than butane, constituting gasoline hydrocarbons, are removed as bottoms from the debutanizer 53 through line 64.

Dissolved water in the liquid product entering depropanizer 45 passes overhead from the depropanizer along with the propane and is condensed with the propane in condenser 51. A portion of this water, depending upon its quantity in the propane, may settle from the propane in reflux accumulator 66. Any water settling from the propane is removed from the accumulator through water draw-off line 70. Following settling and removal of the water, if any, the condensed propane leaves the reflux accumulator through line 71. A portion of this propane is recycled through line 72 as reflux to depropanizer 45.

For removal of dissolved water in the portion of the propane leaving reflux accumulator 66 not returned as reflux to depropanizer 45, dryers 73 and 74 are employed. The portion of the propane not returned as reflux is passed through either of these dryers. The propane enters dryer 73 through line 75 provided with valve 80. The propane enters dryer 74 through the line 71 which is provided with valve 81 downstream from line 75. Each of dryers 73 and 74 are packed with a suitable type of solid desiccant for the removal of water from propane. Silica gel or activated alumina may be employed as desiccants. However, any solid desiccant heretofore employed for the removal of water from propane will be satisfactory. Upon contact of the propane with the desiccant, the dissolved water is removed by adsorption from the propane upon the desiccant. The propane leaves the dryers after contact with the desiccant and is passed to storage. Propane leaves dryer 73 through line 82 provided with valve 83. Propane leaves dryer 74 through line 84 provided with valve 85.

The passage of the liquid propane from the reflux accumulator to storage through the dryers, and associated lines, valves, and other equipment, results in a pressure drop of the propane. When, as a result of pressure drop on the propane, the pressure on the propane becomes less than the vapor pressure of the propane at its temperature at the particular location in the system, gaseous propane will flash from liquid propane. With the formation of gaseous propane, difficulties are encountered in maintaining effective operation of dryers 73 and 74. Gaseous propane accompanying liquid propane passes through the dryers at a velocity greatly in excess of the liquid propane. Where the liquid propane is passed through the dryers at normal velocities, the greatly increased velocity of the gaseous propane causes dislodgment of the desiccant within the dryers and blows desiccant from the dryers through the outlet lines 82 and 84. In accordance with a preferred embodiment of the invention, the propane passing overhead from depropanizer 45 is subcooled, i.e., is cooled to a temperature such that its vapor pressure is below the external pressure on the propane. With subcooling of the liquid propane, a greater degree of pressure decrease on the liquid propane can occur before flashing of gaseous propane is encountered. With sufficient subcooling to reduce the vapor pressure of the condensed propane to a point below any pressure attained by the propane before leaving the dryers, the effects of gaseous propane passing through the dryers is avoided. Accordingly, it is preferred that the liquid propane be subcooled to the extent that its vapor pressure will be below any external pressure on the propane in the system prior to passing out of the dryers. If desired, subcooling may be effected in stages, the stages occurring following drops in pressure or without substantial pressure drop between stages. Preferably, subcooling is effected in condenser 51 along with condensation of the propane. If desired, however, subcooling may be effected by means of a separate cooler or coolers (not shown) acting on the propane subsequent to condensation in condenser 51.

As further propane containing dissolved water is contacted with the desiccant in dryers 73 and 74, the drying effect of the desiccant will decrease as the amount of water adsorbed by the desiccant increases. When the amount of water adsorbed in the desiccant reaches the point where drying of further propane to a commercially acceptable water content becomes no longer practical, the desiccant is regenerated by removing the adsorbed water. For regenerating, or drying, the desiccant, in accordance with the invention, heated propane vapor is employed. A portion of the propane vapor passing overhead from depropanizer 45 through line 50 is passed from line 50 through line 90 to steam heater 91. The propane passes through the heater and is heated therein by indirect heat transfer with steam entering the heater through line 92. Exhaust steam leaves the heater through line 93 provided with steam trap 94.

The heated propane vapor leaves the heater 91 through line 95. Line 95 is connected to line 100 provided with valves 101 and 102. Line 103 provided with valve 104 is connected with line 75 between dryer 73 and valve 80. Line 105 provided with valve 110 is connected with line 71 between dryer 74 and valve 81.

Assuming dryer 73 is to be regenerated, valves 80 and 83 are closed. Valves 81 and 85 will remain open, valves 102 and 110 being closed, to permit operation of dryer 74 while dryer 73 is being regenerated. Valves 101 and 104 are opened and heated propane passes from the heater 91 through dryer 73 and contacts the desiccant within the dryer. The heated propane reaches the temperature of the water above the boiling point and thus vaporizes it from the disiccant. The propane along with the water removed from the desiccant leaves the dryer through line 103.

Assuming regeneration of the desiccant in dryer 74 is to be effected, valves 81 and 85 are closed. Valves 80 and 83 can be opened, valves 101 and 104 being closed, to permit operation of dryer 73 while dryer 74 is being regenerated. Valves 102 and 110 are open and heated propane passes from the heater through the dryer 74 and contacts the desiccant in the dryer. The propane and the water removed from the desiccant leave the dryer through line 105 and enter line 103. For operation of dryer 74 after regeneration, valves 102 and 110 are closed and valves 81 and 85 are opened.

Further, in accordance with the invention, the propane employed for regeneration of the desiccant is thereafter admixed with the overhead product from stripping still 19. This propane passes through the line 103 connected with line 21 passing overhead from stripping still 19 to condenser 22 and is condensed with the overhead product from the stripping still 19 in condenser 22 to become part of the propane in the condensed hydrocarbon product entering deethanizer 33 from the raw feed tank 24. The water removed from the desiccant leaves the system from the raw feed tank 24 through the water draw-off line 30 as part of the water condensed from the overhead from stripping still 19.

A small portion of the propane entering raw feed tank 24 may be uncondensed or otherwise carried out of the raw feed tank as uncondensed vapor through line 25. The greater portion of this propane is recovered by absorption in the absorption oil in reabsorber 15. However, a small amount of propane escapes absorption in reabsorber 15 and passes out of the absorber with the dry gas. To minimize this loss of propane with the dry gas, it is preferred to keep the amount of propane entering the raw feed tank from the dryers at a minimum. This is effected by employing the least amount of propane for regeneration of the desiccant in the dryers as is practical. By heating the propane vapor prior to entering the dryers and contacting the desiccant to a temperature above the boiling point of water at the partial pressure of water within the dryers, the amount of propane required for regeneration of the desiccant is reduced. Preferably, the propane is heated in heater 91 to a temperature about 100° F. above the boiling point of water at the partial pressure of the water within the dryers. However, the propane may be heated in heater 91 to a temperature above the boiling point of water at the partial pressure of the water within the dryers more or less than 100° F., as desired.

In a specific embodiment of the invention, the stripping still 19 is operated at approximately 150 pounds per square inch gauge and the overhead passing through line 21 is at a temperature of approximately 210° F. Depropanizer 45 is operated at a pressure of approximately 205 pounds per square inch gauge and the overhead has a temperature of approximately 105° F. The overhead is cooled in condenser 51 to a temperature of approximately 90° F. and the condensed product enters the reflux accumulator at a pressure of approximately 200 pounds per square inch gauge. Dryers 73 and 74 are operated for drying at a pressure of approximately 190 pounds per square inch gauge. Steam at approximately 225 pounds per square inch gauge is passed through line 92 to steam heater 91 and propane leaving the heater through line 95 is at a temperature of approximately 350° F. The dryers 73 and 74 are regenerated at a pressure of approximately 160 pounds per square inch gauge.

In the operation of the system illustrated in the flow sheet various valves, pumps, and other equipment will be required. For purposes of simplifying description, no mention of this equipment was made. Provision for such equipment, however, may be readily made by those skilled in the art.

Having thus described our invention, it will be understood that such description has been given by way of example and illustration and not by way of limitation, reference for the latter purpose being had to the appended claims.

We claim:

1. In a process for the recovery of propane from natural gas containing methane, ethane, propane, and higher hydrocarbons wherein said natural gas is contacted with an absorption oil in an absorption zone under absorption conditions to absorb said ethane, propane, and higher hydrocarbons from said natural gas in said absorption oil, the improvement comprising blowing steam through said absorption oil containing said absorbed ethane, propane, and higher hydrocarbons in a stripping zone whereby a product containing said ethane, propane, and higher hydrocarbons and said steam is separated from said absorption oil, recyling said absorption oil to said absorption zone, partially condensing said product containing said ethane, propane, and higher hydrocarbons and said steam in a condensation zone to condense at least a portion of said ethane, propane, and higher hydrocarbons and said steam to obtain a product containing liquid ethane, propane, and higher hydrocarbons, water dissolved in said liquid hydrocarbons, and entrained liquid water, separating said entrained liquid water from said product to obtain a product containing said liquid ethane, propane, and higher hydrocarbons, and water dissolved in said liquid hydrocarbons, recycling a portion of said last-named product as reflux to said stripping zone, vaporizing ethane from the remainder of said last-named product in a fractionating zone to separate it from said propane and higher hydrocarbons whereby a greater portion but not all of said dissolved water is vaporized from said last-named product along with said ethane, vaporizing propane thereafter from the remainder of said last-named product in a fractionating zone to separate it from said higher hydrocarbons whereby at least a portion of said dissolved water is vaporized from the remainder of said last-named product along with said propane, removing a stream containing said vaporized propane and said water from said last-named fractionating zone, condensing a portion of said stream containing said vaporized propane and said water to form liquid propane containing dissolved water, recycling a portion of said liquid propane containing dissolved water as reflux to said last-named fractionating zone, passing the remainder of said liquid propane containing said dissolved water through a bed of solid desiccant contained in a drying zone whereby said dissolved water is removed from said liquid propane, recovering said liquid propane passed through said bed of solid desiccant contained in said drying zone, discontinuing passing said liquid propane containing said dissolved water through said bed of solid desiccant when said solid desiccant has absorbed sufficient water that it can no longer remove water from said liquid propane to bring its dissolved water content to a desired value, heating another portion of said stream containing said vaporized propane and water to a temperature above the boiling point of water at the partial pressure of water in said drying zone, passing said heated stream through said bed of solid desiccant contained in said drying zone whereby absorbed water is removed from said solid desiccant, recovering propane and water as a stream from said drying zone, and passing said last-mentioned stream to said first mentioned condensation zone along with said product containing ethane, propane, and higher hydrocarbons and said steam separated from said absorption oil in said stripping zone.

2. In a process for the recovery of propane from natural gas containing methane, ethane, propane, and higher hydrocarbons wherein said natural gas is contacted with an absorption oil in an absorption zone under absorption conditions to absorb said ethane, propane, and higher hydrocarbons from said natural gas in said absorption oil, the improvement comprising blowing steam through said absorption oil containing said absorbed ethane, propane, and higher hydrocarbons in a stripping zone whereby a product containing said ethane, propane, and higher hydrocarbons and said steam is separated from said absorption oil, recycling said absorption oil to said absorption zone, partially condensing said product containing said ethane, propane, and higher hydrocarbons and said steam in a condensation zone to condense at least a portion of said ethane, propane, and higher hydrocarbons and said steam to obtain a product containing liquid ethane, propane, and higher hydrocarbons, water dissolved in said liquid hydrocarbons, and entrained liquid water, separating said entrained liquid water from said product to obtain a product containing said liquid ethane, propane, and higher hydrocarbons, and water dissolved in said liquid hydrocarbons, recycling a portion of said last-named product as reflux to said stripping zone, vaporizing ethane from the remainder of said last-named product in a fractionating zone to separate it from said propane and higher hydrocarbons whereby a greater portion but not all of said dissolved water is vaporized from said last-named product along with said ethane, vaporizing propane thereafter from the remainder of said last-named product in a fractionating zone to separate it from said higher hydrocarbons whereby at least a portion of said dissolved water is vaporized from the remainder of said last-named product along with said propane, removing a stream containing said vaporized propane and said water from said last-named fractionating zone, condensing a portion of said stream containing said vaporized propane and said water to form liquid propane containing dissolved water, recycling a portion of said liquid propane containing dissolved water as reflux to said last-named fractionating zone, passing the remainder of said liquid propane containing said dissolved water upwardly through a bed of solid desiccant contained in a drying zone at a temperature such that the vapor pressure of said propane is below the pressure in said drying zone whereby said dissolved water is removed from said liquid propane, recovering said liquid propane passed through said bed of solid desiccant contained in said drying zone, discontinuing passing said liquid propane containing said dissolved water through said bed of solid desiccant when said solid desiccant has absorbed sufficient water that it can no longer remove water from said liquid propane to bring its dissolved water content to a desired value, heating another portion of said stream containing said vaporized propane and water to a temperature above the boiling point of water at the partial pressure of water in said drying zone, passing said heated stream downwardly through said bed of solid desiccant contained in said drying zone whereby absorbed water is removed from said solid desiccant, recovering propane and water as a stream from said drying zone, and passing said last-mentioned stream to said first-mentioned condensation zone along with said product containing ethane, propane, and higher hydrocarbons and said steam separated from said absorption oil in said stripping zone.

3. In a process for the recovery of propane from natural gas containing methane, ethane, propane, and higher hydrocarbons wherein said natural gas is contacted with an absorption oil in an absorption zone under absorption conditions to absorb said ethane, propane, and higher hydrocarbons from said natural gas in said absorption oil, the improvement comprising blowing steam through said absorption oil containing said absorbed ethane, propane, and higher hydrocarbons in a stripping zone whereby a product containing said ethane, propane, and higher hydrocarbons and said steam is separated from said absorption oil, recycling said absorption oil to said absorption zone, partially condensing said product containing said ethane, propane, and higher hydrocarbons and said steam in a condensation zone to condense at least a portion of said ethane, propane and higher hydrocarbons and said steam to obtain a product containing liquid ethane, propane, and higher hydrocarbons, water dissolved in said liquid hydrocarbons, and entrained liquid water, separating said entrained liquid water from said product to obtain a product containing said liquid ethane, propane, and higher hydrocarbons, and water dissolved in said liquid hydrocarbons, recycling a portion of said last-named product as reflux to said stripping zone, vaporizing ethane from the remainder of said last-named product in a fractionating zone to separate it from said propane and higher hydrocarbons whereby a greater portion but not all of said dissolved water is vaporized from said last-named product along with said ethane, vaporizing propane thereafter from the remainder of said last-named product in a fractionating zone to separate it from said higher hydrocarbons whereby at least a portion of said dissolved water is vaporized from the remainder of said last-named product along with said propane, removing a stream containing said vaporized propane and said water from said last-named fractionating zone, condensing a portion of said stream containing said vaporized propane and said water to form liquid propane containing dissolved water, recycling a portion of said liquid propane containing dissolved water as reflux to said last-named fractionating zone, passing the remainder of said liquid propane containing said dissolved water upwardly through a bed of solid desiccant contained in a drying zone at a temperature of about 90° F. and a pressure of about 190 pounds per square inch gauge whereby said dissolved water is removed from said liquid propane, recovering said liquid propane passed through said bed of solid desiccant contained in said drying zone, discontinuing passing said liquid propane containing said dissolved water through said bed of solid desiccant when said solid desiccant has absorbed sufficient water that it can no longer remove water from said liquid propane to bring its dissolved water content to a desired value, heating another portion of said stream containing said vaporized propane and water to a temperature of approximately 350° F., passing said heated stream downwardly through said bed of solid desiccant contained in said drying zone at a pressure of approximately 160 pounds per square inch whereby absorbed water is removed from said solid desiccant, recovering propane and water as a stream from said drying zone, and passing said last-mentioned stream to said first-mentioned condensation zone along with said product containing ethane, propane, and higher hydrocarbons and said steam separated from said absorption oil in said stripping zone.

4. In a process for the recovery of ethane, propane free of dissolved water, butane, and higher hydrocarbons from natural gas containing methane, ethane, propane, butane, and higher hydrocarbons, the steps comprising passing said natural gas into a first absorption zone, passing lean absorption oil into said first absorption zone, countercurrently contacting said natural gas in said first absorption zone with said lean absorption oil and dissolving a portion of said methane, and said ethane, propane, butane, and higher hydrocarbons in said absorption oil, removing and recovering as a separate stream from said first absorption zone methane not dissolved in said absorption oil, removing as a separate stream from said first absorption zone rich absorption oil containing dissolved therein said methane, ethane, propane, butane and higher hydrocarbons, passing said rich absorption oil to a second absorption zone which is maintained at a lower pressure than said first absorption zone whereby said methane and a portion of said ethane, propane, butane, and higher hydrocarbons flash from said rich absorption oil, passing lean absorption oil into said second absorption zone, countercurrently contacting in said second absorption zone with said lean absorption oil said methane, ethane, propane, butane, and higher hydrocarbons flashed from said rich absorption oil and dissolving said ethane, propane, butane, and higher hydrocarbons in said absorption oil, removing and recovering as a separate stream from said second absorption zone methane not dissolved in said absorption oil, removing as a separate stream from said second absorption zone rich absorption oil containing dissolved therein ethane, propane, butane, and higher hydrocarbons, passing said rich absorption oil to a stripping zone, passing steam to said stripping zone, blowing said steam through said rich absorption oil in said stripping zone and stripping dissolved ethane, propane, butane, and higher hydrocarbons from said absorption oil, removing as a separate stream from said stripping zone a product containing ethane, propane, butane and higher hydrocarbons and steam, removing lean absorption oil as a separate stream from said stripping zone, recycling said lean absorption oil to said first and second absorption zones, partially condensing said product containing ethane, propane, butane, and higher hydrocarbons and steam in a condensation zone and obtaining a liquid product containing liquid ethane, propane, butane, higher hydrocarbons, and dissolved water and entrained liquid water, separating said entrained liquid water from said liquid product, recycling a portion of said liquid product as reflux to said stripping zone, passing the remainder of said liquid product to a first fractionation zone, fractionating said liquid product in said first fractionation zone and removing said ethane and the greater portion of said dissolved water from said liquid product, removing as a separate stream from said first fractionation zone said ethane and said water, condensing said last-named stream and obtaining a second liquid product containing ethane and water, recycling a portion of said second liquid product as reflux to said first fractionation zone, recovering the remainder of said second liquid product, removing as a separate stream said liquid product from said first fractionation zone, passing said liquid product to a second fractionation zone, fractionating said liquid product in said second fractionation zone and removing said propane and at least a portion of the remainder of said dissolved water from said liquid product, removing as a separate stream from said second fractionation zone said propane and said water, condensing a portion of said last-named stream to obtain a third liquid product consisting of liquid propane containing dissolved water, returning a portion of said third liquid product as reflux to said second fractionation zone, removing as a separate stream from said second fractionation zone said liquid product, passing said liquid product to a third fractionation zone, fractionating said liquid product in said third fractionation zone and removing butane from said liquid product, removing as a separate stream from said third fractionation zone said butane, condensing said last-named stream and obtaining a fourth liquid product containing butane, recycling a portion of said fourth liquid product as reflux to said third fractionation zone, recovering the remainder of said second liquid product, recovering as a separate stream from said third fractionation zone as a gasoline product said higher hydrocarbons, passing the remainder of said third liquid product consisting of liquid propane containing dissolved water upwardly through a bed of solid desiccant contained in a drying zone and removing said dissolved water from said liquid propane, recovering liquid propane free of dissolved water from said drying zone, discontinuing passing said third liquid product through said bed of solid desiccant when said solid desiccant has absorbed sufficient water that it can no longer remove water from said liquid product to bring the dissolved water content of said liquid propane to a desired value, heating the remainder of said stream containing said vaporized propane and water from said second fractionation zone to a temperature above the boiling point of water at the partial pressure of water in said drying zone, passing said heated stream downwardly through said bed of solid desiccant contained in said drying zone whereby absorbed water is removed from said solid desiccant, recovering propane and water as a separate stream from said drying zone, and recycling said last-mentioned stream by passing it to said first condensation zone along with said product containing ethane, propane, butane, and higher hydrocarbons and steam separated from said absorption oil in said stripping zone.

References Cited in the file of this patent
UNITED STATES PATENTS

| | | |
|---|---|---|
| 2,224,227 | Keith et al. | Dec. 10, 1940 |
| 2,271,761 | Coulter et al. | Feb. 3, 1942 |
| 2,356,890 | Schulze | Aug. 29, 1944 |
| 2,500,353 | Gantt | Mar. 14, 1950 |
| 2,573,341 | Kniel | Oct. 30, 1951 |
| 2,608,270 | McDonald et al. | Aug. 26, 1952 |
| 2,726,191 | Mannas | Dec. 6, 1955 |
| 2,727,588 | Woertz | Dec. 20, 1955 |